(12) United States Patent
Yang et al.

(10) Patent No.: US 6,580,810 B1
(45) Date of Patent: Jun. 17, 2003

(54) METHOD OF IMAGE PROCESSING USING THREE FACIAL FEATURE POINTS IN THREE-DIMENSIONAL HEAD MOTION TRACKING

(75) Inventors: Tzong-Jer Yang, Tainan (TW); Fu-Che Wu, Taipei (TW); Ming Ouhyoung, Taipei (JP)

(73) Assignee: Cyberlink Corp., Taipei (TW)

( * ) Notice: Subject to any disclaimer, the term of this patent is extended or adjusted under 35 U.S.C. 154(b) by 0 days.

(21) Appl. No.: 09/329,671

(22) Filed: Jun. 10, 1999

(30) Foreign Application Priority Data

Feb. 26, 1999 (TW) .................................. 88102962 A

(51) Int. Cl.[7] ............................. G06K 9/00; H04N 7/14
(52) U.S. Cl. ...................... 382/103; 348/14.1; 382/154
(58) Field of Search .................................. 382/103, 106, 382/107, 117, 118, 285, 295, 296, 154; 348/14.1

(56) References Cited

U.S. PATENT DOCUMENTS

| | | | | |
|---|---|---|---|---|
| 5,420,638 A | * | 5/1995 | Riglet et al. | 348/700 |
| 5,581,276 A | * | 12/1996 | Cipolla et al. | 345/156 |
| 5,659,625 A | * | 8/1997 | Marquardt | 345/634 |
| 6,029,173 A | * | 2/2000 | Meek et al. | 707/102 |
| 6,044,168 A | * | 3/2000 | Tuceryan et al. | 345/582 |
| 6,047,078 A | * | 4/2000 | Kang | 382/107 |
| 6,091,836 A | * | 7/2000 | Takano et al. | 382/100 |
| 6,332,033 B1 | * | 12/2001 | Qian | 382/118 |
| 6,381,346 B1 | * | 4/2002 | Eraslan | 345/420 |

OTHER PUBLICATIONS

Tzong–Jer et al., "Real–time 3–D head motion estimation in facial image coding", Proceedings in Multimedia Modeling, Oct. 12, 1998.*

Pipitone et al., "tripod operators for recognizing objects in range images: rapid rejection of library objects", IEEE Proceedings o International Conference on Robotics and Automation, May 14, 1992, pp. 1596–1601, vol. 2.*

Haung et al., Motion and structure from feature correspondences: a review, Proceedings of the IEEE, Feb. 1994, pp. 252–268.*

Aizawa et al., "Analysis and synthesis of facial image sequences in model–based image coding", IEEE transactions on Circuits and Systems for video technology, Jun. 1994, pp. 257–275.*

* cited by examiner

*Primary Examiner*—Amelia M. Au
*Assistant Examiner*—Martin Miller
(74) *Attorney, Agent, or Firm*—Fish & Richardson P.C.

(57) ABSTRACT

A method of image processing in three-dimensional (3-D) head motion tracking is disclosed. The method includes: providing a user's source image to a first processing device; capturing the user's first image and providing it to a second processing device; selecting three facial feature points of the first image from the second processing device to form a 3-D feature triangle; capturing user's consecutive video frames and providing them to the second processing device when the user proceeds with head motions; tracking the three facial feature points corresponding to the consecutive video frames to form a series of actual 2-D feature triangle; rotating and translating the 3-D feature triangle freely to form a plurality of geometric transformations, selecting one of the geometric transformations with acceptable error between the two consecutive 2-D feature triangles, repeating the step until the last frame of the consecutive video frames and geometric transformations corresponding to various consecutive video frames are formed; and providing the geometric transformations to the first processing device to generate a head motion corresponding to the user's source image.

14 Claims, 7 Drawing Sheets

METHOD OF IMAGE PROCESSING USING THREE FACIAL FEATURE POINTS IN THREE-DIMENSIONAL HEAD MOTION TRACKING

BACKGROUND OF THE INVENTION

1. Field of the Invention

This invention relates to a method of image processing, particularly to a method of image processing using three facial feature points in 3-D head motion tracking.

2. Description of Related Art

In recent years, model-based image coding has drawn public attention, specifically its foreseeable application in visual communication, such as videophone or the virtual meeting mentioned in MPEG-4 Applications Document, ISO/IEC JTC1/SC29/WG11/N1729, July 1997. Since the primary subject in visual communication is the head section (and part of shoulders) of an image, the focus falls mainly on the head to reduce the data load in transmission. One possible approach is to introduce an explicit 3-D head model, such as the well-known CANDIDE face model (Mikael Rydfalk "CANDIDE-a Parameterised Face," Linkoping University, Report LiTH-ISY-I-0866, October 1987) with texture mapping. A general system model of model-based face image coding is shown in FIG. 1. A user's face model is first inputted into an encoder 10 and then adapted to fit the face image, and analyses on the model are employed to extract meaningful face features, as well as head motion. These analysis data are then sent through a transmission medium 15 to a decoder 20 to synthesize a realistic face image.

Besides, methods for inferring 3-D motion from 2-D images in 3-D motion estimation can largely be divided into the following two classifications:

1. Use of 2-D feature points; and
2. Use of optic flow information.

In most methods, correspondences from 2-D feature points or selected pixels are first established, and inference of 3-D motion with perspective projection are next made if only rigid body motion is involved.

In the first classification, in Thomas S. Huang and Arun N. Netravali's "Motion and Structure from Feature Correspondences: A Review," Proceedings of the IEEE, vol. 82, No. 2, pp. 252–268, February 1994, Huang and Netravali had categorized and introduced different algorithms to infer 3D motions either for 3D-to-3D feature correspondences, 2D-to-3D feature correspondences, or 2D-to-2D feature correspondences. They concluded, at least 5 feature points are necessary to figure out the actual 3D motion. Further, in Roger Y. Tsai and Thomas S. Huang's "Uniqueness and Estimation of Three-Dimensional Motion Parameters of Rigid Objects with Curved Surfaces," IEEE Trans. on Pattern Analysis and Machine Intelligence, vol. PAMI-6, No. 1, pp. 13–27, January 1984, Tsai and Huang proposed a linear algorithm for solving the 2D-to-2D feature correspondences with eight feature points.

In the second classification, luminance differences between two 2D images are utilized. Under the assumption of fixed lighting, the intensity differences between two consecutive video frames are mainly due to object motion. This method is adopted in OBASC (Object-Based Analysis-Synthesis Coder) and KBASC (Knowledge-Based Analysis-Synthesis Coder) developed at the University of Hannover (Liang Zhang, "Tracking a face for knowledge-based coding of videophone sequences," Signal Processing: Image communication, vol. 10, pp. 93–114, 1997; Jorn Ostermann, "Object-based analysis synthesis coding based on the source model of moving rigid 3D objects," Signal Processing: Image communication, vol. 6, pp. 143–161, 1994). Li et al. also elaborated this concept and proposed a method that estimates motion with "no correspondence problem" (in Haibo Li, Pertti Roivainen, and Robert Forchheimer, "3-D Motion Estimation in Model-Based Facial Image Coding," IEEE Tran. on Pattern Analysis and Machine Intelligence, vol. 15, No. 6, pp. 545–555, June 1993). Moreover, Netravali and Salz (in A. N. Netravali and J. Salz, "Algorithms for Estimation of Three-Dimensional Motion," AT&T Technical Journal, vol. 64, No. 2, pp. 335–346, February 1985) derived robust algorithms for estimating parameters of the motion of rigid bodies observed from a television camera. In their algorithms, the capture rate of a television camera (30 frames/sec) is specifically considered.

However, in a practical software-based application for visual communication, the following two constraints have to be considered:

1. Real-time requirement for on-line communication;
2. Each additional feature point adds extra work load in pattern recognition.

SUMMARY OF THE INVENTION

Accordingly, this invention provides a method of image processing of three-dimensional (3-D) head motion with three facial feature points, including the following steps: providing a user's source image to a first processing device; capturing the user's first image and providing it to a second processing device; selecting three facial feature points of the first image from the second processing device to form a 3-D feature triangle; capturing user's consecutive video frames and providing them to the second processing device when the user proceeds with head motions; tracking the three facial feature points corresponding to the consecutive video frames to form a series of actual 2-D feature triangle; rotating and translating the 3-D feature triangle freely to form a plurality of geometric transformations, selecting one of the geometric transformations with acceptable error between the two consecutive 2-D feature triangles, and repeating the step until the last frame of the consecutive video frames and geometric transformations corresponding to various consecutive video frames are formed; and providing the geometric transformations to the first processing device to generate a head motion corresponding to the user's source image.

Facial feature points are three feature points such as the positions of the lateral canthus of the two eyes and the nose, or the ear-tips and the lower chin. The three feature points form a feature triangle and are calibrated. The motion between two consecutive video frames is slight, and human head motion reveals the following characteristics, namely: (1) Feature points are fixed and the three feature points form a feature triangle that can be considered as a rigid body; (2) most head motions are rotation dominated, and (3) the rotation pivot of one's head can be considered to be at the center of his neck. 3-D head motion estimate can be inferred from consecutive video frames with steepest-descent iterative method. Subsequently, if an estimate for 3-D head motion is not acceptable, error recovery can be made for the 3-D head motion estimate with a prediction process, such as Grey System.

The embodiment as disclosed in this invention presents a procedure that estimates head motion from two consecutive video frames using three feature points. Here, a precise solution is not intended, rather, an approximate one is provided because, for a videophone application, one needs not to know how many degrees a user on the other side turns his or her head, but to see natural face orientation.

Also, a camera captures a new image every tenth to thirtieth of a second. During such a small period, changes in motion would be small, and a simple steepest-decent iterative method that tries each transformation adaptively should be able to resolve the unknown transformation quickly. The local minimum obtained is usually close to the global minimum since the 3-D positions obtained in the last frame give a good initial guess for the iteration used in the frame.

Furthermore, some characteristics in human head motion may help to design good error criteria that guide iterations toward the global minimum. However, incorrect estimations are still possible, so the capability to recover from incorrect results is necessary. Prediction algorithms are usually employed to provide a next possible step from previous history data, so a prediction algorithm in the motion estimation procedure for error recovery is included. In fact, the prediction algorithm can also help to smooth estimated motions.

Moreover, a calibration procedure that also utilizes human head characteristics to simplify the calibration procedure is designed in this embodiment.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE EMBODIMENT

Figure 1:
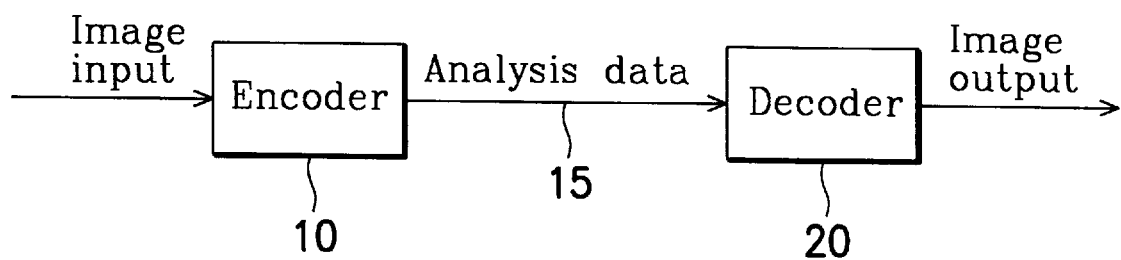
FIG. 1 is a diagram illustrating a conventional model-based facial image encoding system.
Figure 2:
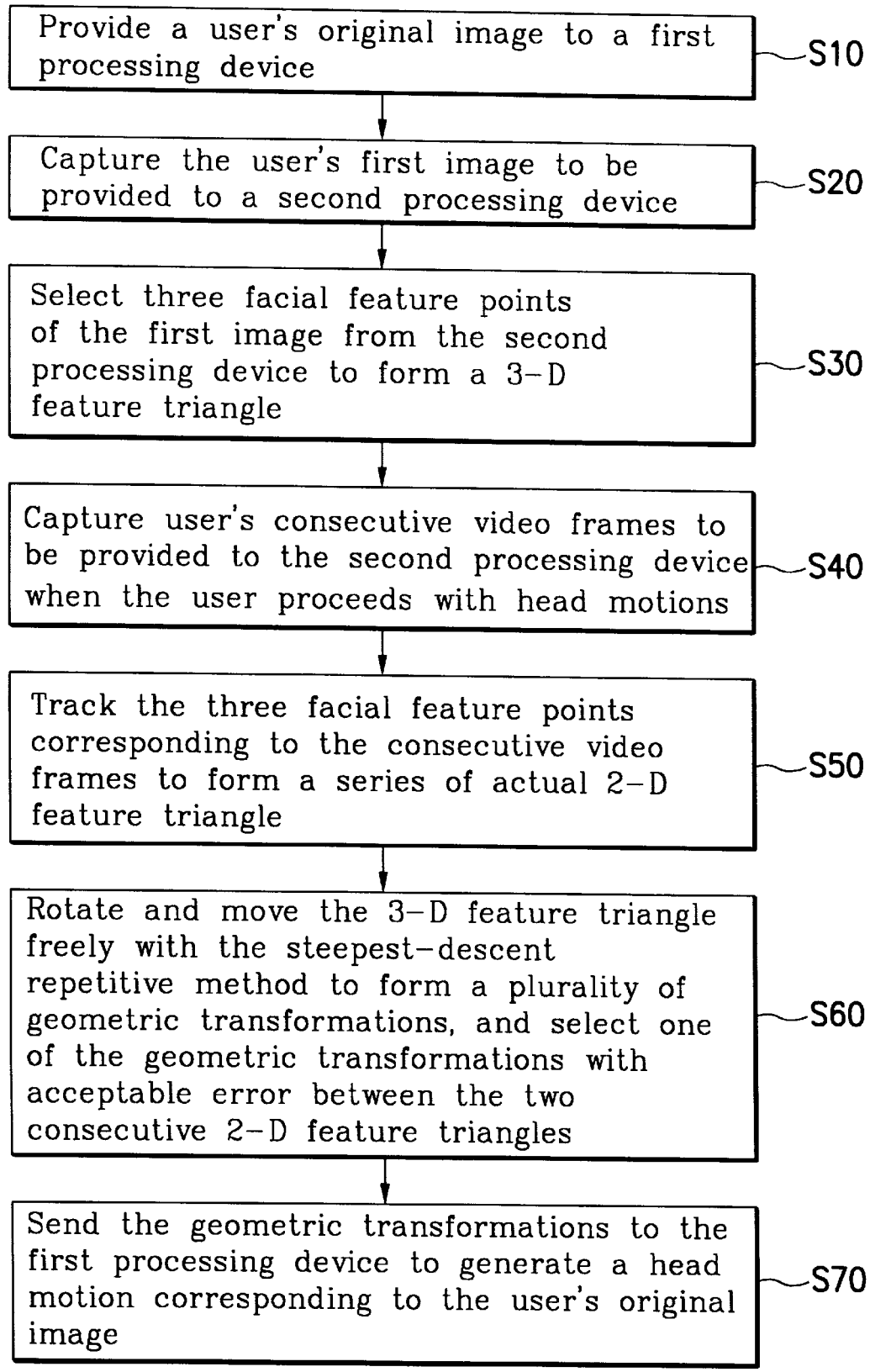
FIG. 2 is a flowchart illustrating the image processing method using facial 3-point feature values in 3-D head motion in an embodiment of this invention.
Figure 3:
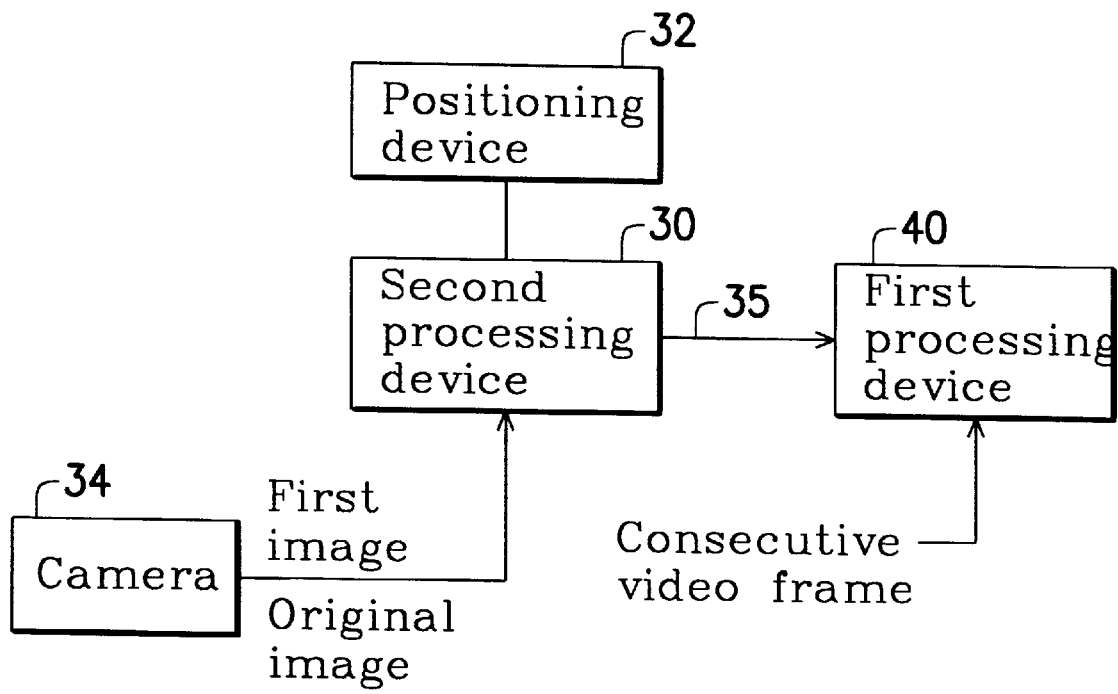
FIG. 3 illustrates the system of the embodiment of FIG. 2.

Refer to the flowchart of FIG. 2 and the image processing system of FIG. 3, wherein a method of image processing three facial feature points on a 3-D head motion includes the following steps:

In accordance with Step S10, provide a user's source image to a first processing device, such as the image processing device 40.

In accordance with Step S20, capture the user's first image to be provided to a second processing device, such as the image processing device 30.

In accordance with Step S30, select three facial feature points of the first image from the second processing device 30 to form a 3-D feature triangle.

In accordance with Step S40, capture user's consecutive video frames to be provided to the second processing device 30 when the user proceeds with head motions.

In accordance with Step S50, track the three facial feature points corresponding to the consecutive video frames to form a series of actual 2-D feature triangle.

In accordance with Step S60, rotate and translate the 3-D feature triangle freely with the steepest-descent iterative method, select the acceptable geometric transformations from the two consecutive 2-D feature triangle errors; repeat this Step until the last frame of the consecutive video frames and geometric transformations corresponding to various consecutive video frames are formed.

And in accordance with Step S70, provide the geometric transformations to the first processing device 40 to generate a head motion corresponding to the user's source image.

Each step is described as follows.

Step S10

Figure 4:
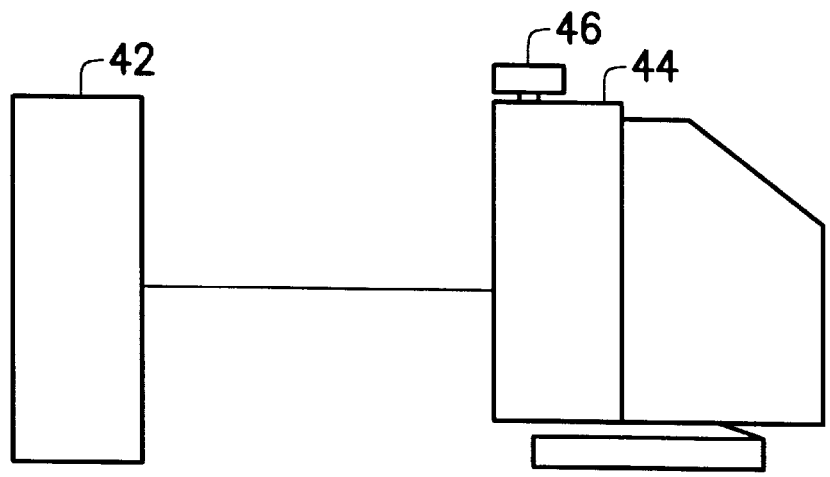
FIG. 4 is a diagram illustrating the processing device of FIG. 3.

Since this method can be applied to video conferencing and image-voice mail, the first processing device 40 and the second processing device 30 are assumed to be in different locations, for example, one in the United States and the other in Taiwan. The user is at a place where the second processing device 30 is located, that is, the United States. Therein, the main purpose of said step is to provide a source image to the user, or to capture with an image capturing device, such as a camera, an image at user's second processing device 30 to be provided to the first image processing device 40 as the source image. Generally, an image capturing device, as shown in FIG. 4, comprises a processor 42, a display unit 44, and an image capturing device, such as a camera 46.

Step S20

As stated earlier, in accordance with this step, user's first image can be captured and provided to the second processing device 30 through an image capturing device such as the camera 46.

Step S30

In accordance with the step, a positioning device, such as a mouse, is used to point-select three feature points, such as the lateral canthus of the two eyes and the nose, or the two ear-tips and the lower chin of the first image as the three facial feature points of the first image from the second processing device 30 to form a pre-built 3-D feature triangle.

Next, in actual video conferencing application, facial feature points are extracted and tracked and will be described later. In addition, a calibration procedure is designed in accordance with the feature triangle formed with facial feature points, and head motion features are used to simplify the entire calibration process.

Figure 5A:
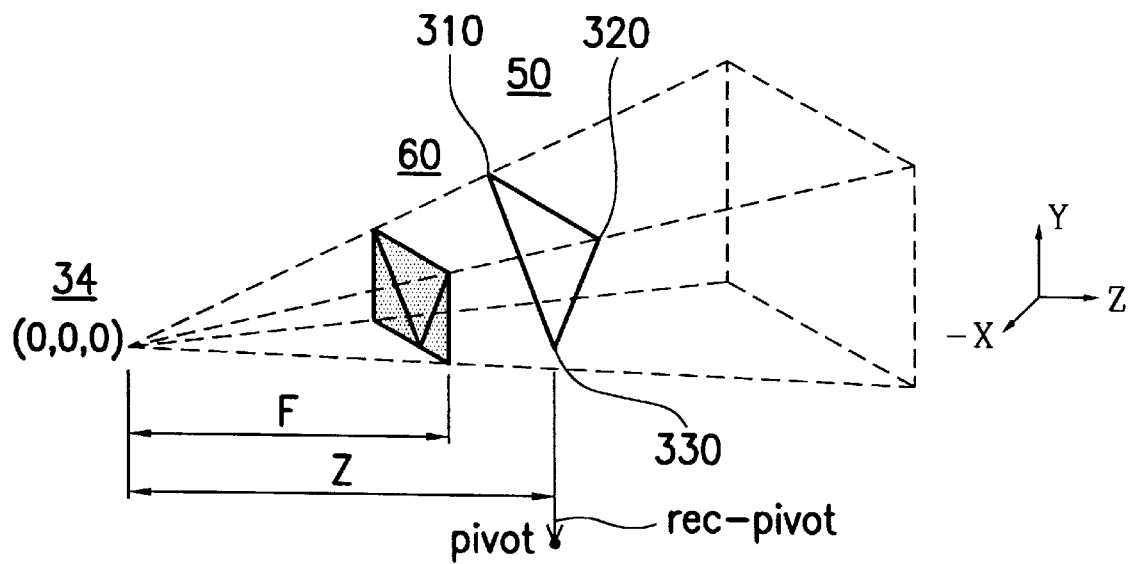
FIGS. 5a and 5b are diagrams illustrating the calibration of 3-D feature triangle.
Figure 5B:
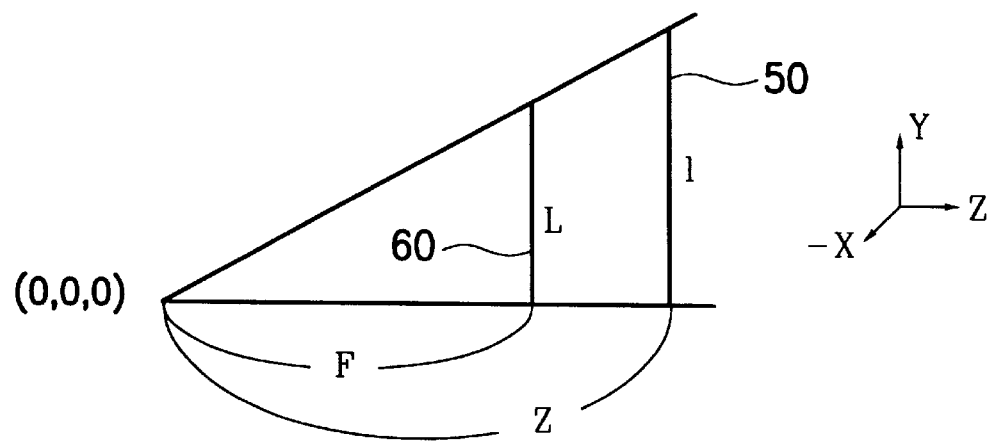

Refer to FIGS. 5a and 5b, diagrams illustrating the calibration process of pre-configuring a 3-D feature triangle. First, since this embodiment requires a feature triangle 50 pre-built with three facial feature points 310, 320, and 330, said feature triangle can be automatically calibrated by capturing user's front face through a camera 34. That is, in video image applications, said feature triangle needs a calibration procedure to conform with the actual feature triangle formed with the lateral canthus of the two eyes and the nose, so the pivot will be in the right position.

This embodiment proposes the following assumptions in accordance with the features of human head motion:
1. The perimeter of the feature triangle 50 is 1, deemed a constant, that is, the value 1 will not vary with persons.
2. The vector vec_pivot from the nose to the pivot (central point of the neck) can be deemed a fixed vector.

The following equation is obtained from the geometric projection of the image:

$$\frac{L}{F} = \frac{l}{z} \quad (1)$$

where F is the distance from a camera (0,0,0) to the projection plane 60, z is the ground depth of the feature triangle 50. Assume the initial pre-built feature triangle is perpendicular to the X-Z plane, then at time of the calibration, user's face must directly face to the camera. L is the length of the projected image onto the projection plane, while 1 is the perimeter of the pre-built 3-D feature triangle. If the length of z and 1 are constant, or 600.0 mm and 220.0 mm in this embodiment respectively, and the value of L is the perimeter of the feature triangle obtained from calculating the image, then the value of F can be calculated.

Next according to equation (2)

$$X = F\frac{x}{z}, \quad Y = F\frac{y}{z} \quad (2)$$

Where p represents a point in 3-D space $(x,y,z)^t$, whereas P represents a 2-D coordinate $(X,Y)^t$ corresponding to its perspective projection.

If F is obtained and the same value of z is assigned in the beginning to the three feature points 310, 320, and 330, then X and Y can be extracted from the feature points; thus, the 3-D positions of the three feature points can be determined. The calibrated feature triangle will face to the direction of Z axis, and the position of the camera can be at point (0,0,0).

The 3-D position of the pivot can be determined with a constant vector vec_pivot, its value defined as $(0.0, -80.0, 110.0)^t$ in this embodiment. It is the under and behind the nose (units in millimeter).

In accordance with Step S40, when the user's head is in motion, user's consecutive video frames are captured and provided to the second processing device 30.

Step S40

As stated earlier, in accordance with this step, user's consecutive video frames are captured with an image capturing device such as camera 46 and provided to the second processing device 30 when the user proceeds with head motions.

Step S50

In accordance with this step, the three facial feature points corresponding to the consecutive video frames are tracked to form a sequence of actual 2-D feature triangles.

Figure 6:
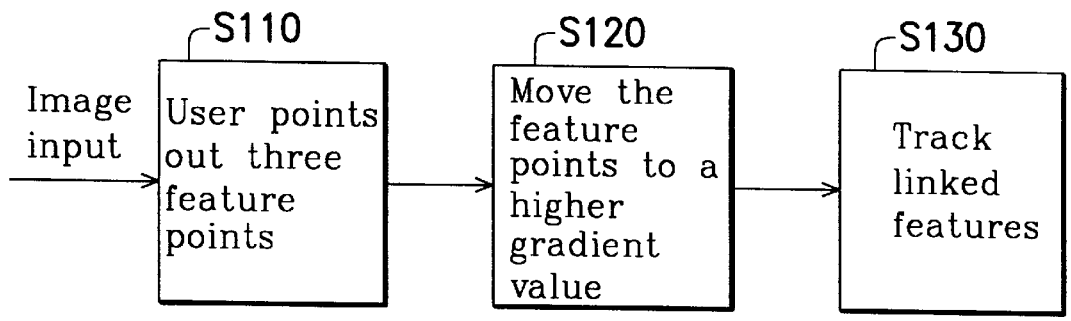
FIG. 6 is a flowchart illustrating the tracking of facial feature points

Therein, the procedure is as follows with reference to FIG. 6:

In accordance with Step S110, three facial feature points of the first image are point-selected by the positioning device;

in accordance with Step S120, the three facial feature points are moved to higher gradient values, such as high-contrast zones of the face; and in accordance with Step S130 three facial feature points corresponding to these consecutive video frames are linked and tracked.

In this embodiment, when consecutive video frames are inputted, facial feature points are first selected in respect to the first image. For example, the feature points are extracted with a positioning device 32, such as a mouse. The positions of the three feature points of the two eyes and the nose are first determined, then the three feature points are moved to the nearest high gradient, such as the high-contrast area in the face. Next, the feature points are tracked by determining the correlation of the adjusted feature points, wherein the correlation is defined as follows:

$$score(m_1, m_2) = \frac{\sum_{i=-n}^{n} \sum_{j=-m}^{m} ([I_1(u_1+i, v_1+j) - \overline{I_1(u_1,v_1)}] \times [I_2(u_2+i, v_2+j) - \overline{I_2(u_2,v_2)}])}{(2n+1)(2m+1)\sqrt{\sigma^2(I_1) \times \sigma^2(I_2)}}$$

Where $$\overline{I_k(u,v)} = \frac{\sum_{i=-n}^{n} \sum_{j=-m}^{m} I_k(u+i, v+j)}{(2n+1)(2m+1)}$$

is the average of the color values k=1,2 of the frame $I_k$ at point (u, v),

Whereas $$\sigma(I_k) = \sqrt{\frac{\sum_{i=-n}^{n} \sum_{j=-m}^{m} I_k^2(u+i)(v+j)}{(2n+1)(2m+1)} - \overline{I_k(u,v)}^2}$$

is the standard deviation of frame $I_k$ of $(2n+1)\times(2m+1)$ in size at point (u.v).

The correlation value is within the range of −1 (totally dissimilar) and 1 (totally identical), for determining the size of the correlation window $(2n+1)\times(2m+1)$.

Figures 7A, 7B:
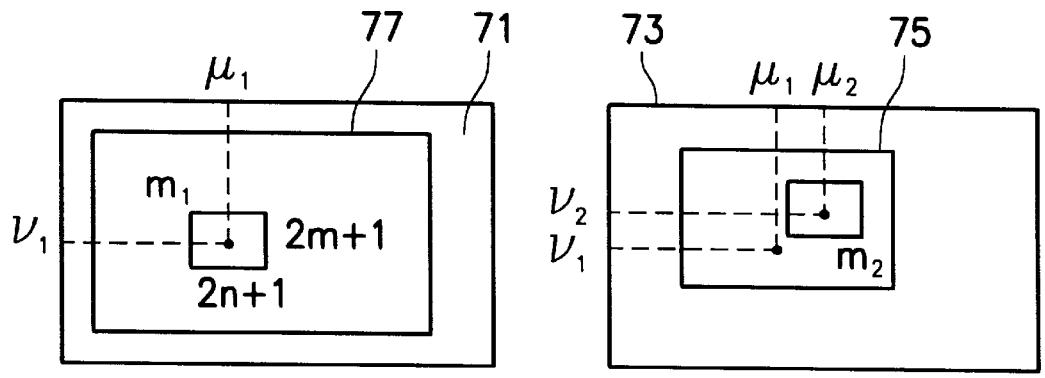
FIGS. 7a and 7b are diagrams illustrating the relation between two consecutive video frames.

The correlation of two consecutive video frames is shown in FIG. 7. A point $m_1$ is given in the first frame image 71, and the point $m_2$ corresponding to the second frame image can be found by searching a position with the highest correlation in the search window 75 with a size specified by the second frame image 73.

In this embodiment, the size of the search window 75 is 13×13, while the size of the correlation window 77 is 17×17. The search window is smaller than the correlation window because there are many high gradient areas to the eyes, such as the eyebrows, eyeglasses. The size of the search window 75 can be reduced to minimize mismatches. In effect, since the search window 75 is smaller, even blinking eyes will not cause error in matching, and the larger correlation window 77 can be more precise in matching.

Step S60

After the three feature points of two consecutive video frames are tracked smoothly, the corresponding 3-D head motions can be calculated with the "steepest-descent iterative method."

In accordance with Step S60, the 3-D feature triangle is rotated and moved freely with the steepest-descent iterative method, the geometric transformations are selected from the two consecutive 2-D feature triangle with acceptance error; this Step is repeated until the last frame of the consecutive video frames and geometric transformations corresponding to various consecutive video frames are formed.

In this embodiment, 3-D motion estimation from a sequence of facial feature points is performed by moving a sequence of facial feature points. First, the system description of a 3-D motion inference is built.

As stated earlier, let p represent a point in 3-D space $(x,y,z)^t$, whereas P represent a 2-D coordinate $(X,Y)^t$ corresponding to its perspective projection.

$$X = F\frac{x}{z}, \quad Y = F\frac{y}{z} \quad (2)$$

Where F is the distance from the camera to the projection plane. Further, the rigid body motion is defined as $$p' = Rp + t, \quad p' = Rp + t, \quad \text{or} \quad (3)$$

$$\begin{bmatrix} x' \\ y' \\ z' \end{bmatrix} = R \begin{bmatrix} x \\ y \\ z \end{bmatrix} + t = \begin{bmatrix} r_{11} & r_{12} & r_{13} \\ r_{21} & r_{22} & r_{23} \\ r_{31} & r_{32} & r_{33} \end{bmatrix} \begin{bmatrix} x \\ y \\ z \end{bmatrix} + \begin{bmatrix} t_1 \\ t_2 \\ t_3 \end{bmatrix}$$

where R is a rotation matrix, and t is a translation vector.

Given the three 2-D feature points of two consecutive video frames: $\{P_0, P_1, P_2\}$ and $\{P_0', P_1', P_2'\}$, then one set of 2-D feature points $\{P_0, P_1, P_2\}$ moves to another set of 2-D feature points $\{P_0', P_1', P_2'\}$ (including rotation and translation), the corresponding 3-D geometric movement transformation, that is the R and t in equation (3), can be estimated with the "steepest-descent iterative method." In this method, three feature points are used to first pre-build a 3-D feature triangle, then the pre-built 3-D feature triangle is calibrated. Next, a set of two consecutive video frames freely rotates and translates said pre-built 3-d feature triangle in said sequence of practical 2-D feature triangles with the steepest-descent iterative method to form 12 geometric transformations, and the acceptable error distance between two practical 2-D feature triangles is selected to form an estimated 3-D feature triangle. The estimated 3-D feature triangle then replaces the pre-built 3-d feature triangle. The previous procedure is repeated until the last frame of said consecutive video frames and the geometric transformations corresponding to various consecutive video frames are formed.

Steepest Descent Iterative Method

For example, the pre-built feature triangle is rotated and translated freely and the following steps are repeated: rotating or translating in each direction of the X, Y, and Z axes at a given angle or offset. The rotation stage is done by rotating the feature triangle about X-, Y-, and Z-axes in both clockwise and counterclockwise directions. The translation stage is done by translating the feature triangle along X-, Y-, and Z-axes in both positive and negative directions. After these twelve transformations, we choose the transformation with the smallest error distance between $\{P_0, P_1, P_2\}$ and $\{P_0', P_1', P_2'\}$. This process is repeated until the error is acceptable, or the maximum iteration number is achieved.

Figure 8A:
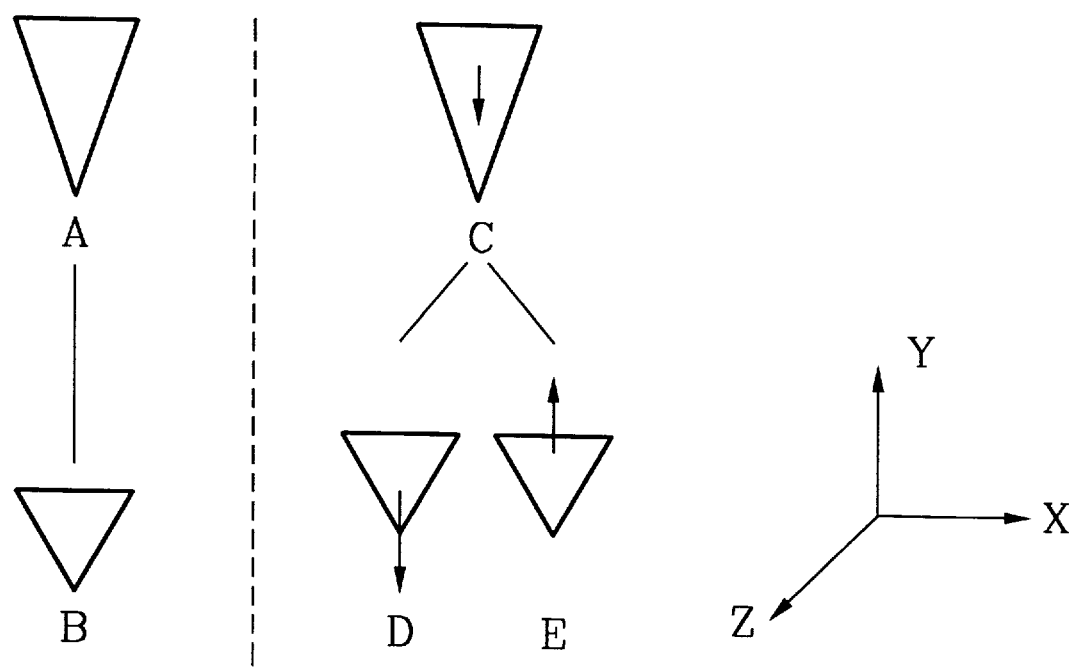
FIG. 8a is a diagram illustrating geometric transformations made by 2-D coordinates.

However, as shown in FIG. 8a, 2-D coordinates cannot determine the only 3-D motion from typical perspective projection. For example, a triangle A is rotated about X-axis to form another triangle B. If an arrow is used to represent the surface normal of the triangle, both geometric transformations D and E that rotate about X-axis in clockwise and counterclockwise are found to result in the same projection outcomes.

Furthermore, it is possible in the computation process to get a computed result where the estimated motion is a translation but the real one is a rotation.

This embodiment introduces domain knowledge of human head motion to overcome the problems.

Human head motion has the following characteristics:

(1) Feature points are fixed and the three feature points form a feature triangle that can be considered as a rigid body.

(2) Most head motions are rotation dominated.

(3) The rotation pivot of one's head can be considered to be at the center of his neck.

Figure 8B:
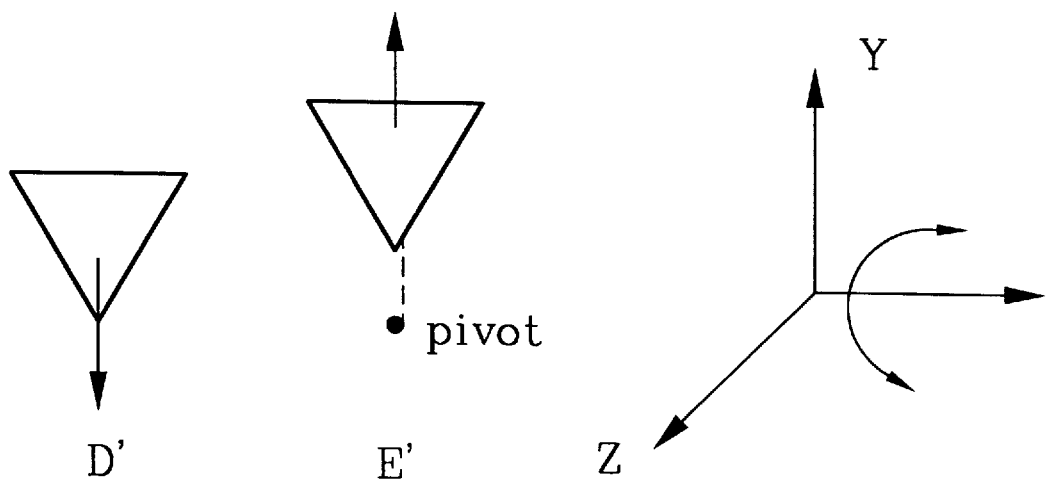
FIG. 8b is a diagram illustrating geometric transformations made by 2-D coordinates when the neck is the center of the rotating axis.
Figure 9A:
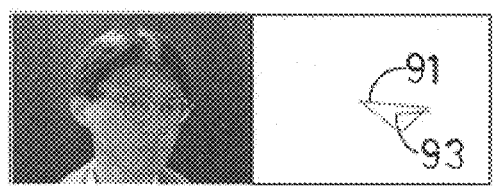
FIGS. 9a–9l illustrate the direction of face motion of the image represented with 3-D feature triangle and surface normal.
Figure 9G:
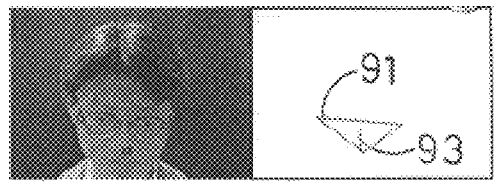
Figure 9B:
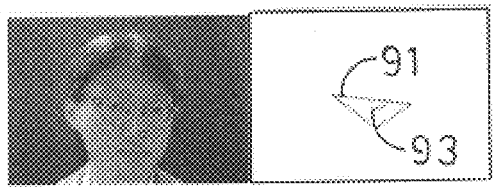
Figure 9H:
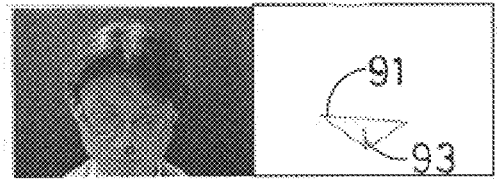
Figure 9C:
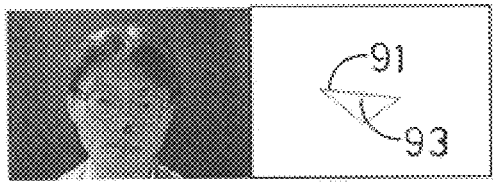
Figure 9I:
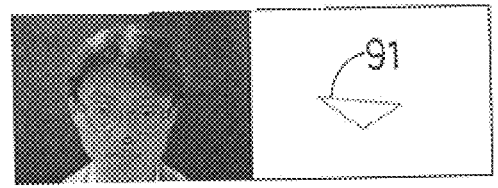
Figure 9D:
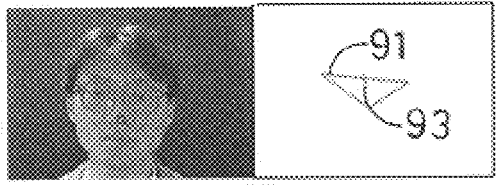
Figure 9J:
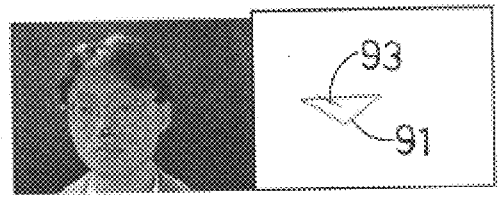
Figure 9E:
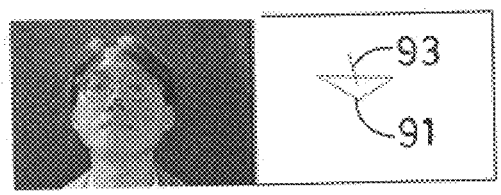
Figure 9K:
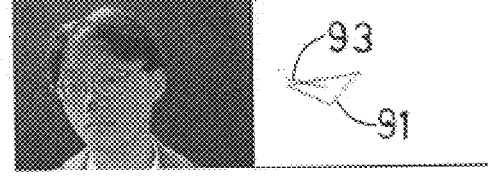
Figure 9F:
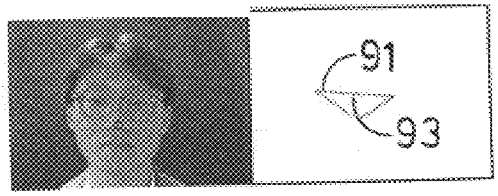
Figure 9L:
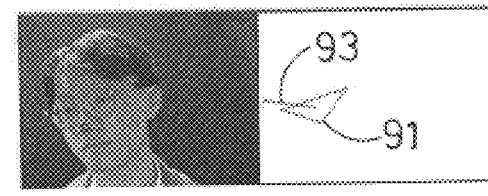

In accordance with characteristic (1), three appropriate feature points are found in this embodiment, such as the lateral canthus of the two eyes and the nose. In accordance with characteristic (2), in this embodiment rotations are first tried, and then translations. In accordance with characteristic (3), the ambiguity as shown in FIG. 8a can be avoided, because a rotation about X-axis in clockwise or counterclockwise direction will yield an offset in Y-axis, as shown in FIG. 8b, where the pivot of the two geometric transformations D' and E' is at the center of the neck.

In the repeated iterations, this embodiment provides an error rotation function and an error translation function for finding the correct 3-D geometric transformation. Both error functions evaluate error by measuring differences between the real and the estimated 2-D feature triangles. The real 2-D feature triangle is obtained by applying feature extraction on a video frame; the estimated 2-D feature triangle is the perspective projection of the estimated 3-D feature triangle.

The rotation error function ErrR is defined as:

$$ErrR = aT_1 + bT_2 + cT_3 + dT_4, \text{ where}$$

$$T_1 = \sum_{i=0}^{2} |P_i^{real} - P_i^{estimated}|, \quad P_i^{real} \neq P_i^{estimated}$$

are the real and the estimated 2-D feature points ($T_1$: vertex distance)

$$T_2 = \sum_{i=0}^{2} |P_i^{real\_aligned} - P_i^{estimated\_aligned}|,$$

where $P_i^{real\_aligned} = P_i^{real} - P_c^{real}$, $P_i^{estimated\_aligned} = P_i^{estimated} - P_c^{estimated}$ and $P_c^{real} = \frac{1}{3}\sum_{i=0}^{2} P_i^{real}, \quad P_c^{estimated} = \frac{1}{3}\sum_{i=0}^{2} P_i^{estimated}$ ($T_2$: triangle similarity by vertex distance after aligning both centers of gravity)

$$T_3 = \left|\frac{\overline{P_0^{real}P_1^{real}}}{\overline{P_1^{real}P_2^{real}}} - \frac{\overline{P_0^{estimated}P_1^{estimated}}}{\overline{P_1^{estimated}P_2^{estimated}}}\right| + \left|\frac{\overline{P_1^{real}P_2^{real}}}{\overline{P_2^{real}P_0^{real}}} - \frac{\overline{P_1^{estimated}P_2^{estimated}}}{\overline{P_2^{estimated}P_0^{estimated}}}\right|$$

($T_3$: triangle shape similarity by edge length ratios)

$$T_4 = |slope(\overline{P_0^{real}P_1^{real}}) - slope(\overline{P_0^{estimated}P_1^{estimated}})| +$$
$$|slope(\overline{P_1^{real}P_2^{real}}) - slope(\overline{P_1^{estimated}P_2^{estimated}})| +$$
$$|slope(\overline{P_2^{real}P_0^{real}}) - slope(\overline{P_2^{estimated}P_0^{estimated}})|,$$

$$slope(\overline{P_iP_j}) = \frac{Y_j - Y_i}{X_j - X_i}$$

($T_4$: triangle shape similarity by edge slopes)

where $T_1$ is to avoid the ambiguity shown in FIG. 8a because of the rotation pivot at the neck. and a rotation in a wrong direction will cause a larger $T_1$. $T_2$, $T_3$, and $T_4$ are all used to measure the similarity between the real 2-D feature triangle and the estimated one. $T_2$ measures vertex distance by aligning both the real and estimated ones with their centers of gravity aligned; $T_3$ measures shape similarity using edge ratios; $T_4$ measures shape similarity using edge slopes. Weighting factors a, b, c, and d are set to be 0.3, 0.2, 0.2, and 0.3 in this embodiment.

The translation error function ErrT is defined as:

ErrT=$T_1$ that just measures vertex distances.

In addition, though an error recovery function provided in this embodiment can guide aforementioned iterations to a correct direction, it is still possible to be trapped into a local minimum and the error will increase. To recover from incorrect estimations, a prediction algorithm, such as the Grey system (as specified in Jiann-Rong Wu and Ming Ouhyoung's "Reducing The Latency in Head-Mounted Display by a Novel Predition Method Using Grey System Theory," Computer Graphics Forum, Vol. 13, No. 3, pp. C503–512, 1994) that gives a second chance to figure out a correct transformation is adopted. The Grey system prediction can predict the next 3-D positions of the three feature points and obtain a predicted 2-D feature triangle from the 3-D feature triangle through perspective projection. Hence, the aforementioned error functions can be used to measure the error value between the predicted 2-D feature triangle and the actual feature triangle. If the error value between the predicted 2-D feature triangle and the actual feature triangle is smaller than the error value between the estimated 2-D feature triangle and the actual feature triangle, then the predicted 3-D feature triangle is adopted to replace the estimated 3-D feature triangle; otherwise, the estimated one will still be used.

The Grey system prediction algorithm directly generates next 3-D positions, so the corresponding geometric transformation cannot be obtained. Nevertheless, only 3-D geometric transformations need to be calculated in 3D-to-3D correspondence. The above problems can be solved in accordance with the algorithms proposed by Huang and Netravali in Thomas S. Huang and Arun N. Netravali's "Motion and Structure from Feature Correspondences: A Review," Proceedings of the IEEE, vol. 82, No. 2, pp. 252–268, February 1994, where the required singular value decomposition (SVD) of a 3×3 matrix is resolved with the Meschach library of numerical functions.

The coordinate of the 3-D feature triangle of each image and its surface normal can be obtained in accordance with the geometric transformations of the consecutive video frames.

Step S70

In accordance with this step, the geometric transformations, such as rotation matrix R and translation matrix t, can be provided to the first processing device 40 through a transmission medium, such as the network 35, to generate a head motion corresponding to the user's source image.

Besides, the "clip-and-paste method," as suggested in Kiyoharu Aizawa and Thomas S. Huang's "Model-Based Image Coding: Advanced Video Coding Techniques for Very Low Bit-Rate Applications," Proceedings of the IEEE, vol. 83, No. 2, pp. 259–271, February 1995, can be adopted for face synthesis of the face where variations are expressive, such as in the eyes and the mouth.

Execution Results

The computation system of the entire 3-D head motion of the second processing device 30 is implemented on Microsoft's Windows 95 platform. For the benefit of debugging and displaying clearly the calculated results, in this embodiment the calculated results of the direction toward the face are sent to the first processing device 40, as shown in FIGS. 9a–9l. The device captures frame segments of the video frames from a segment of the calculated results of 3-D head motion. Various 3-D transformations such as the rotation and translation data are obtained from the calculated results. For clarity, they are represented in 3-D feature triangle 91 and its surface normal 93, wherein the surface normal is the direction toward the face.

The overall system executes more than 25 frames on a Pentium-II 400 MHz PC, as shown in FIGS. 9a–9l. Since only three feature points, the eyes and the nose, are required, the user can point-select with a positioning device within three seconds.

The head model calibration process is simple and only requires a user to face to the camera directly, and the whole calibration process could be done within one second. In fact, users are not aware of this calibration process. In experiments, this procedure is user-independent and works fine with different cameras. Furthermore, a user's head needs not be at the center of the capture window when the calibration process is performed since the calibration procedure will also reset the origin to be at the center of the extracted feature triangle.

Further, this method performs more than 250 computations per second on a Pentium-II 233 MHz PC.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of image processing three-dimensional (3-D) head motion with three facial feature points comprising the following steps:
    (a) providing a user's source image to a first processing device;
    (b) capturing said user's first image and providing it to a second processing device;
    (c) selecting three facial feature points of said first image from said second processing device to form a 3-D feature triangle;
    (d) capturing user's consecutive video frames and providing them to the second processing device when said user proceeds with head motions;
    (e) tracking said three facial feature points corresponding to said consecutive video frames to form a series of actual 2-D feature triangle;
    (f) rotating and translating said 3-D feature triangle freely to form a plurality of geometric transformations;
    (g) selecting one of the geometric transformations with acceptable error between the two consecutive 2-D feature triangles;
    (h) repeating the step (f) and (g) until the last frame of said consecutive video frames and geometric transformations corresponding to various consecutive video frames are formed; and
    (i) providing said geometric transformations to said first processing device to generate a head motion corresponding to said user's source image.

2. The method of claim 1, wherein said source image is an existing photograph.

3. The method of claim 1, wherein in said Step (b) a camera captures user's first image and provides it to a second processing device.

4. The method of claim 1, wherein in said Step (c) a 3-D feature triangle is formed by selecting with a positioning device three facial feature points of the first image from said second processing device.

5. The method of claim 1, wherein in said Step (c) a 3-D feature triangle is formed by selecting with a mouse three facial feature points of the first image from said second processing device.

6. The method of claim 1, wherein said geometric transformations include the coordinates and surface normal of the three points of the 3-D feature triangle.

7. The method of claim 1, wherein said three feature points are selected points of the face considered largely as a rigid body.

8. The method of claim 1, wherein said three feature points are selected points of the lateral canthus of the eyes and the nose on the face.

9. The method of claim 1, wherein said three feature points are selected points of the ear-tips and the lower chin on the face.

10. The method of claim 1, wherein in said step (f), said 3-D feature triangle is first rotated and then translated.

11. The method of claim 1, wherein a pivot of said head motion is a point in center of an upper neck of said user's source image.

12. The method of claim 1, wherein in said step (i), said geometric transformations are transmitted to said first processing device through a transmission medium for generating head motion corresponding to said user's source image.

13. The method of claim 12, wherein in said step (i), said transmission medium includes network transmission medium.

14. A method of image processing three-dimensional (3-D) head motion with three facial feature points comprising the following steps:
    (a) providing a user's source image to a first processing device;
    (b) capturing said user's first image and providing it to a second processing device;
    (c) selecting three facial feature points of said first image from said second processing device;
    (d) pre-building a 3-D feature triangle in accordance with the three facial feature points;
    (e) capturing user's consecutive video frames and providing them to the second processing device when said user proceeds with head motions;
    (f) tracking said three facial feature points corresponding to said consecutive video frames to form a series of actual 2-D feature triangle;
    (g) rotating and translating said pre-built 3-D feature triangle freely with steepest-descent iterative method to form a plurality of geometric transformations;
    (h) selecting one of the geometric transformations with acceptable error between said two consecutive actual 2-D feature triangles to form an estimated 3-D feature triangle;
    (i) replacing said pre-built 3-D feature triangle with said estimated 3-D feature triangle and repeating sequentially step (g) and (h) until the last frame of said consecutive video frames; and
    (j) providing said geometric transformations to said first processing device to generate a head motion corresponding to said user's source image.

* * * * *